Jan. 21, 1969  W. G. CARTWRIGHT  3,422,871
SKID CHAIN TIGHTENER
Filed Nov. 9, 1965

William G. Cartwright
INVENTOR.

United States Patent Office 3,422,871
Patented Jan. 21, 1969

3,422,871
SKID CHAIN TIGHTENER
William G. Cartwright, 229 Braden School Road,
Beaver Falls, Pa. 15010
Filed Nov. 9, 1965, Ser. No. 507,073
U.S. Cl. 152—217                                  9 Claims
Int. Cl. B60c 27/00

ABSTRACT OF THE DISCLOSURE

A connector and tensioner for a pair of end aligned tension members comprising a frame including long and short longitudinal and transverse sides, respectively, with one of the long sides defining a slide member, one of the adjacent ends of the tension members being attached to the frame at the intersection of one of the long sides and one of the short sides and the adjacent end of the other tension member being slidably engaged with the other long side and a third tension member having one end secured to the other short side of the frame whereby the third tension member may be pulled in a direction extending at right angles to the end aligned tension members so as to slide the tension member slidably engaged with the other long side of the frame and thereby connect the end aligned tension members across the narrow transverse width of the frame.

---

This invention relates to a novel and useful skid chain tightener and primarily to a connector member which may be utilized to join two tension member sections and which may be utilized to alternately increase and decrease the effective combined length of the tension member sections connected thereby.

The connector has been specifically designed for use in connection with vehicle skid chains but its construction also enables it to be utilized in other environments in which it is desirable to connect a pair of tension member sections and to vary the effective combined length of the tension member sections.

The tension member connector of the instant invention comprises a generally frame-like body including an elongated base member of predetermined length with a pair of generally straight elongated slide arm members secured to opposite end portions of the base member and projecting outwardly of one side of the base member. The slide arm members are inclined slightly toward the remote ends of the base member so as to be outwardly convergent. The ends of the slide arm members remote from the base member are rigidly interconnected and the slide arm members extend from the corresponding end portions of the base member distances greater than the distance between the base ends of the slide arm members secured to the base member. In this manner, two endmost links of a pair of tension member chain sections may be slidingly engaged with the slide arm members and spaced a maximum distance apart when one of the links is seated in one corner of the frame-like body defined by the base end of one of the slide arm members and the corresponding end of the base member and the other link is engaged with the outermost end of the other slide arm member. Thereafter, if it desired to move the aforementioned endmost chain links closer together, the frame-like body may be swung to a position with a plane disposed normal to the chain sections passing through the apex or intersection of the ends of the slide arm members remote from the base member. By swinging the frame-like body in this manner, the endmost chain links are seated in the corresponding corners of the frame defined at the intersections of the slide arm members with the base member, which corners are disposed closer together than one of the corners and the apex of the frame-like body defined by the intersection of the outer ends of the slide arm members.

The main object of this invention is to provide a novel skid chain construction including a center circumferential chain section in addtion to the usual opposite side circumferential chain sections and which includes connections with at least some of the cross chain sections of the skid chain extending between the opposite side chain sections and also includes means whereby the effective length of the center circumferentially extending chain or chain section may be shortened so as to compressively engage the periphery of the associated vehicle wheel on which the skid chain construction is disposed.

Another object of this invention is to provide the aforementioned center circumferential chain section with a plurality of the tension adjusting and chain section connectors of the instant invention with the various connectors being adapted to be interconnected by means of conventional resilient chain tighteners in a manner such that the chain tensioning and chain section connectors may be maintained in their chain tensioning positions.

A final object of this invention to be specifically enumerated herein is to provide a connector in accordance with the preceding objects which will conform to conventional forms of manufacture, be of simple construction and easy to use so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary side elevational view of a conventional form of motor vehicle wheel shown with a somewhat conventional skid chain operatively mounted thereon and with the center circumferentially extending skid chain tensioning chain section of the instant invention and including a plurality of the chain tensionng connectors operatively associated with the skid chain so as to maintaint he latter in a tightened condition on the vehicle wheel;

Figure 1:
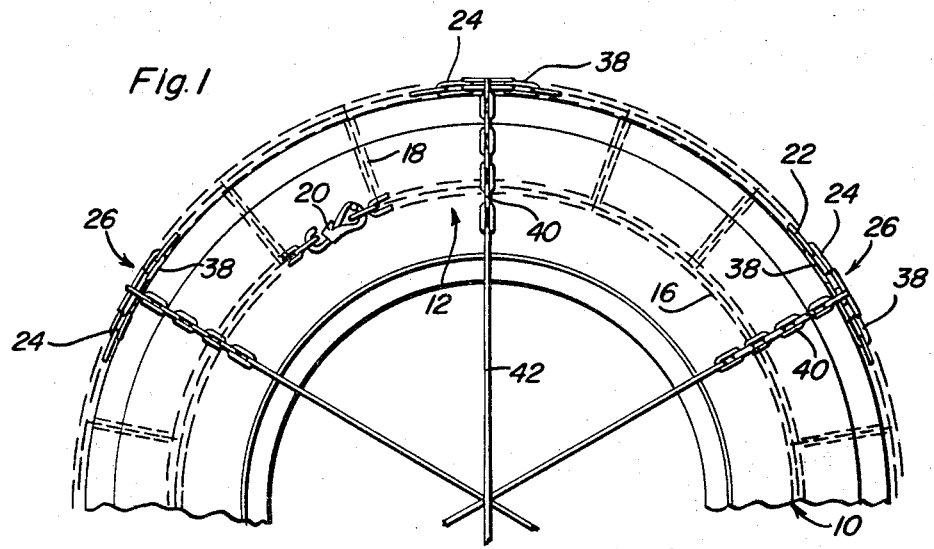

Referring now more specifically to the drawings, the numeral 10 generally designates a conventional form of motor vehicle wheel having a skid chain assembly generally referred to by the reference numeral 12 mounted thereon.

The skid chain assembly 12 includes a pair of generally parallel circumferentially extending opposite side chain sections 14 and 16 interconnected by means of a plurality of cross chain sections 18 in the usual manner. Conventional opposite side chain end connector assemblies 20 are also utilized to secure the free ends of the opposite side chain sections 14 and 16 together.

The foregoing description may be said to be conventional exclusive of many types of skid chain tensioning assemblies which may be utilized and attached to one of the opposite side chain sections 14 and 16 to shorten its effective length after the skid chain assembly 12 has been applied to the wheel 10 so as to have the effect of tightening the skid chain assembly 12 on the wheel 10. However, these conventional forms of skid chain tightening assemblies are often ineffective to maintain the center portions of the cross chain sections 18 in a tightened condition on the associated vehicle. In addition, conventional skid chain tightening assemblies do not increase the traction afforded an associated vehicle wheel.

However, as will be hereinafter more fully set forth, the modified skid chain construction of the instant invention not only assures that at least the center portions of the cross chain sections 18 will be tightly engaged with the outer periphery of the vehicle wheel 10, but also includes means by which the traction afforded the vehicle wheel 10 by the skid chain assembly 12 is appreciably increased.

The skid chain assembly of the instant invention includes, in addition to the circumferentially extending opposite side chain sections 14 and 16, a circumferentially extending center chain 22 which comprises a plurality of chain sections 24 disposed in end-to-end relation and permanently connected by means of a plurality of chain section connectors generally referred to by the reference numerals 26.

Each of the cross chains 18 is secured at its midportion to the corresponding portion of the center chain member 22 by linking one of its chain links to an adjacent chain link of the chain member 22.

Figure 4:
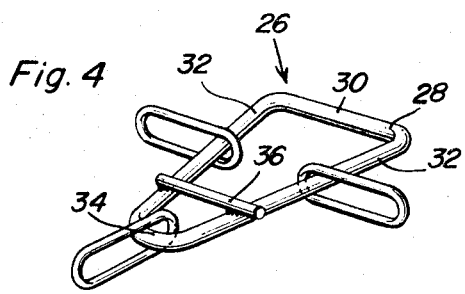
FIGURE 4 is a perspective view of one of the chain tensioning connectors of the instant invention.

With attention now invited more specifically to FIGURE 4 of the drawings, it may be seen that each of the connectors 26 comprises a generally frame-like body 28 including an elongated base member 30 terminating at its opposite ends in a pair of generally straight elongated slide arm members 32 which project outwardly of the same side of the base 30 and are outwardly convergent and joined at their outer ends by means of an integral bight portion 34 defining an anchor portion. In addition, the outer end portions of the slide arm members 32 are also rigidly interconnected by means of a transverse brace member 36 rigidly secured to and extending between each pair of slide arm members 32.

Each of the sections 24 includes an endmost link 38 which is slidingly engaged with the corresponding slide arm member for movement longitudinally therealong between the corresponding brace member 36 and the corresponding base 30. The distance between the corners of the frame 28 defined by the intersections of the base ends of the slide arm members 32 with the base member 30 and which define anchor points for the endmost links 38 is less than the distance between those corners and the opposing corners defined by the intersections of the opposite slide arm members and the corresponding ends of the brace member 36, which opposing corners define limit positions of sliding movement of the endmost links 38 along the slide arm members 32 away from the base 30.

Figure 2:
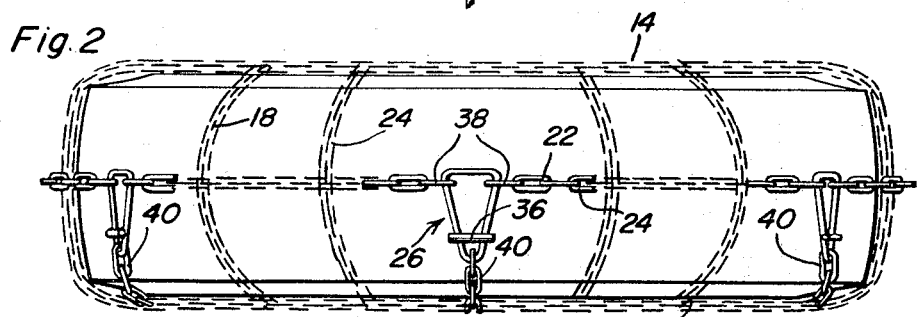
FIGURE 2 is a top plan view of the embodiment illustrated in FIGURE 1.
Figure 3:
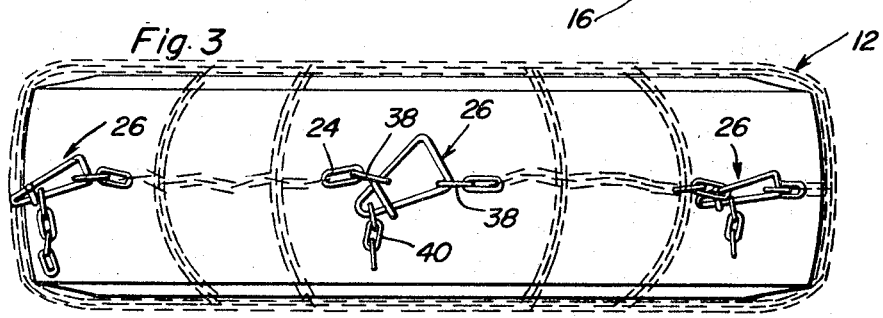
FIGURE 3 is a top plan view similar to FIGURE 2 but illustrating the chain tensioning connectors in positions releasing the tension on the corresponding center circumferentially extending chain section of the skid chain.

In operation, after the skid chain assembly 12 has been applied to the wheel 10 as illustrated in FIGURE 3 of the drawings and the remote ends of the side chains 14 and 16 have been secured together in the manner hereinbefore set forth so as to be reasonably tight, the center chain member 22 may be tensioned in a manner to clampingly engage the center of the periphery of the tire 10. When the chain assembly 12 is applied to the wheel 10, the frames 28 are disposed as illustrated in FIGURE 3 of the drawings in order that the endmost links 38 of each pair of adjacent sections 24 are disposed the greatest possible distance apart so as to lengthen the chain member 22 as much as possible. Then, one set of free ends of short chain sections 40 are engaged with the bight portions or anchor portions 34 of the frames 28 and the other set of ends thereof may be pulled over the side chain 16 and interconnected by any suitable conventional chain tightening assembly such as by a plurality of elongated elastic members 42, see FIGURE 1. The elastic members 42 are secured between the free ends of the short chain sections 40 disposed diametrically opposite each other and in this manner tension is applied to the frames 28 tending to pivot the frames 28 from the positions illustrated in FIGURE 3 of the drawings toward the positions illustrated in FIGURE 2 of the drawings. As the elastic members 42 are secured to the short chain sections 40 as illustrated in FIGURE 1 of the drawings, some of the frames 28 may pivot to the positions thereof illustrated in FIGURE 2 of the drawings. This of course will decrease the distance between the endmost links 38 of adjacent chain sections 24 and decrease the over-all length of the chain member 22. However, any frames 28 which are not pivoted or swung to the positions illustrated in FIGURE 2 of the drawings as the elastic members 42 are utilized to interconnect the free ends of diametrically opposite chain sections 40 will pivot to such positions further foreshortening the effective length of the chain member 22 so as to cause the latter to tightly clampingly engage the wheel 10 as the wheel 10 is rotated in contact with the ground.

Accordingly, it may be seen that the chain member 22 may be utilized to tighten the entire chain assembly 12 on the wheel 10 and that it also serves as a means for providing additional traction in that substantially the entire length of the chain member 22 is rolled in contact with the supporting ground surface as the wheel 10 rolls over that surface.

As hereinbefore set forth, the connectors 26 of the skid chain assembly 12 may also be utilized in other environments wherein it is desired to decrease the effective length of a substantially rigid tension member such as the chain member 22.

What is claimed as new is as follows:

1. In combination, a tension member including a pair of spaced generally end aligned sections including adjacent end portions, a tension member section connector and tension increasing and decreasing assembly comprising a frame-like body including an elongated base member, a generally straight elongated slide arm member secured at one base end to said base member adjacent one end thereof and projecting outwardly of one side of said base member and inclined at least slightly toward the other end of said base member, means at said other end of said base member defining an anchor point, one of said end portions being attached to said frame at said anchor point and the other of said end portions being slidingly engaged with said slide arm member for sliding movement therealong between a first position adjacent said base member and a second position spaced a greater distance from said point than said first position, said body including an anchor portion disposed laterally outwardly of said one side of said base member and on a line disposed at generally right angles to said base member at a point spaced intermediate its opposite ends, said anchor portion being adapted to have one end of a third tension member section secured thereto for effecting an outward pull on said anchor portion away from said adjacent end portions.

2. The combination of claim 1 wherein said slide arm member includes abutment means on its end portion remote from said base member engageable by said other end portion to limit outward sliding movement of said other end portion along said slide arm member to a position with said other end portion disposed in said second position.

3. The combination of claim 1 including a skid chain assembly, said skid chain assembly including generally parallel opposite side chain sections having a plurality of cross chain sections secured therebetween at corresponding points spaced longitudinally of said opposite side chain sections, said tension member sections comprising the opposite end portions of a center chain section disposed between said side chain sections and secured to at least some of said cross chain sections intermediate their opposite ends at points spaced longitudinally along said center chain section.

4. The combination of claim 3 including a third tension member section having one end secured to said anchor portion for exerting a pull on said anchor portion of said body away from said base member.

5. The combination of claim 1 including a skid chain assembly, said skid chain assembly including generally parallel opposite side chain sections having a plurality of cross chain sections secured therebetween at corresponding points spaced longitudinally of said opposite side chain sections, said tension member sections comprising the opposite end portions of a center chain section disposed between said side chain sections and secured to at least some of said cross chain sections intermediate their opposite ends at points spaced longitudinally along said center chain section, said center section comprising at least two end aligned chain sections with each pair of adjacent ends of the last-mentioned sections being secured together by means of one of said connectors.

6. The combination of claim 1 wherein said frame-like body includes a second generally straight elongated slide arm member secured at one end to said base member adjacent the other end thereof and projecting outwardly of said one side of said base member and inclined toward said one end of said base member, the intersection between said second slide arm member and said base member defining said anchor point.

7. The combination of claim 6 wherein said one end portion is slidable along said second slide arm member.

8. The combination of claim 7 wherein said slide arm members include abutment means on their end portions remote from said base member engageable by the corresponding end portions of said sections defining limit positions of outward sliding movement of said end portions of said sections along said slide arm members, said abutment means on the first-mentioned slide arm member defining a limit position of sliding movement of said other of said end portions comprising said second position thereof.

9. The combination of claim 8 wherein said abutment means comprises the opposite end portions of an elongated rigid brace member connected between the ends of said slide arm members remote from said base member.

References Cited

UNITED STATES PATENTS

| 1,598,680 | 9/1926 | Grace | 59—90 |
| 2,450,487 | 10/1948 | Schaber | 152—233 X |

ARTHUR L. LA POINT, *Primary Examiner.*

CHARLES B. LYON, *Assistant Examiner.*

U.S. Cl. X.R.

59—90